United States Patent [19]

Evers

[11] Patent Number: 5,218,202
[45] Date of Patent: Jun. 8, 1993

[54] METHOD FOR AUTOMATIC DRIFT STABILIZATION IN RADIATION MEASUREMENT WITH A DETECTOR

[75] Inventor: Dieter Evers, Straubenhardt, Fed. Rep. of Germany

[73] Assignee: Laboratorium Prof. Dr. Rudolf Berthold GmbH & Co., Wildbad, Fed. Rep. of Germany

[21] Appl. No.: 875,180

[22] Filed: Apr. 28, 1992

[30] Foreign Application Priority Data

Apr. 29, 1991 [DE] Fed. Rep. of Germany ....... 4114030

[51] Int. Cl.⁵ .............................................. G01T 1/20
[52] U.S. Cl. ................................. 250/252.1; 250/362; 250/369; 250/357.1
[58] Field of Search ................. 250/252.1 R, 369, 362, 250/357.1

[56] References Cited

U.S. PATENT DOCUMENTS 4,611,117 9/1986 Seibert et al. ................ 250/252.1 R

FOREIGN PATENT DOCUMENTS 1809520 10/1979 Fed. Rep. of Germany .
665291 4/1988 Switzerland .

*Primary Examiner*—Carolyn E. Fields
*Attorney, Agent, or Firm*—Spensley Horn Jubas & Lubitz

[57] ABSTRACT

A method for automatic drift stabilization in radiation measurement with a detector, a pulse amplitude integral of measured radiation being produced as a standard for the radiation energy absorbed by the detector, using control devices connected to the output side of the detector to adjust the amplification of the detector output on the basis of a defined threshold in the detector output pulse energy spectrum in such a manner that the rate of all detector output pulses having a pulse height greater than the threshold is kept constant, and the measurement result is correspondingly corrected thereby, wherein the threshold is located in the vicinity of a peak in the pulse amplitude spectrum that is caused by the energy loss of naturally occurring cosmic radiation or a component thereof in the detector.

7 Claims, 1 Drawing Sheet

METHOD FOR AUTOMATIC DRIFT STABILIZATION IN RADIATION MEASUREMENT WITH A DETECTOR

BACKGROUND OF THE INVENTION

The invention relates to a method for automatic drift stabilization in radiation measurement with a detector, the pulse amplitude integral of which measurement is a standard for the radiation energy absorbed by the detector, using control devices connected to the output side of the detector, in which a defined threshold in the pulse amplitude spectrum is used to adjust the amplification in such a manner that the rate of all the pulses having a pulse height greater in comparison with a threshold is kept constant, and the measurement outcome is correspondingly corrected thereby.

A method of this generic type is disclosed in German Patent 18 09 520, which issued on Oct. 11, 1979. In that method, a threshold S of a pulse magnitude G is defined such that the number, or rate, of pulses with a magnitude above this threshold value S can be "split off" with the aid of an integral discriminator, and this pulse rate can be kept constant.

This means that changes in the number of these pulses, which are for instance dictated by undesirable changes in amplification in the downstream evaluation circuit, can be reliably eliminated; that is, the control has a drift-stabilizing effect. Points in the pulse spectrum that are located on the edge of a peak are especially suitable as an "orientation point" for such a threshold S, because in that case a particularly sensitive drift stabilization can be carried out.

A special feature of the method described in the above-cited patent is that the measurement radiation source itself, or its pulse height distribution, is used for drift stabilization.

Stabilization with an additional external light source is disclosed in Swiss Patent 665 291, which issued on Apr. 29, 1988. Here, a scintillation detector is supplied not only by the radiation source used for the actual measurement but also by a further light source, in a modulated form, so that the downstream photoelectric converter can make a distinction from the light pulses originating in the irradiation radiation source. The number of reference pulses from the source is then used to stabilize the scintillation detector.

Each of these methods has specific disadvantages. Since the method of German Patent 18 09 520 also uses the measurement radiation source as a reference source for the drift stabilization, measurement radiation of sufficient intensity must always reach the detector.

Yet precisely this does not occur, for instance with continuous fill level measurements. The measurement radiation intensity at the detector fluctuates markedly with the fill level, and as a rule is absorbed completely when the container is full.

In radiometric fill level measurements, not only NaI scintillators and a rod irradiator but also large-volume plastic scintillators in rod form with lengths of up to 2 m, and spot irradiators, are used. While the measurement accuracy for fill level measurements does not require drift stabilization in the case of NaI detectors, drift stabilization is necessary in large-volume plastic scintillators, because of the lower yield of fluorescence and poorer collection of light.

The desire for using large-volume plastic scintillators may have led to the solution described in Swiss Patent 665 291 with the additional external reference light source. However, in terms of apparatus, this embodiment is quite complicated because of the necessary additional electronic components.

SUMMARY OF THE INVENTION

It is therefore an object of the present invention to further improve, and in particular simplify, these processes of drift stabilization so that the method can be used with plastic scintillators in particular.

According to the invention, the above and other objects are attained by a method for automatic drift stabilization in radiation measurement with a detector, a pulse amplitude integral of measured radiation being produced as a standard for the radiation energy absorbed by the detector, using control devices connected to the output side of the detector to adjust the amplification of the detector output on the basis of a defined threshold in the detector output pulse energy spectrum in such a manner that the rate of all detector output pulses having a pulse height greater than the threshold is kept constant, and the measurement result is correspondingly corrected thereby, which method includes locating the threshold in the vicinity of a peak in the pulse amplitude spectrum that is caused by the energy loss of naturally occurring cosmic radiation or a component thereof in the detector.

Accordingly, the basic concept of the invention is to use neither the measurement radiation source itself (as in German Patent 18 09 520) nor a separate external radiation source(as in Swiss Patent 665 291), but rather the natural cosmic radiation that is always present, which at a specific energy loss of approximately 1.7 MeV/g/cm$^2$ undergoes an energy loss of approximately 2 MeV, for instance in a plastic scintillator 1 cm in thickness, and consequently causes a corresponding peak in the pulse height spectrum of the scintillation light that can be detected by the photomultiplier. This peak is far above the useful radiation used for radiometric transmission measurements; although the intensity of this peak is low, nevertheless it is not effected by any other radiation and can consequently be used for drift stabilization, by setting the aforementioned threshold in the region of this peak or of its edge.

All the effects that contribute to amplification fluctuations, such as temperature or age-related fluctuations in fluorescence yield and changes in light attenuation in the scintillator, are compensated for, as are fluctuations in the downstream detector provided for detecting the scintillation light emerging from the scintillator, and in the electronic components switched downstream.

An exemplary embodiment of a measurement array with which the method according to the invention can be carried out, and the method itself will be described in further detail below with reference to the drawing.

DESCRIPTION OF THE PREFERRED EMBODIMENTS

Figure 1:
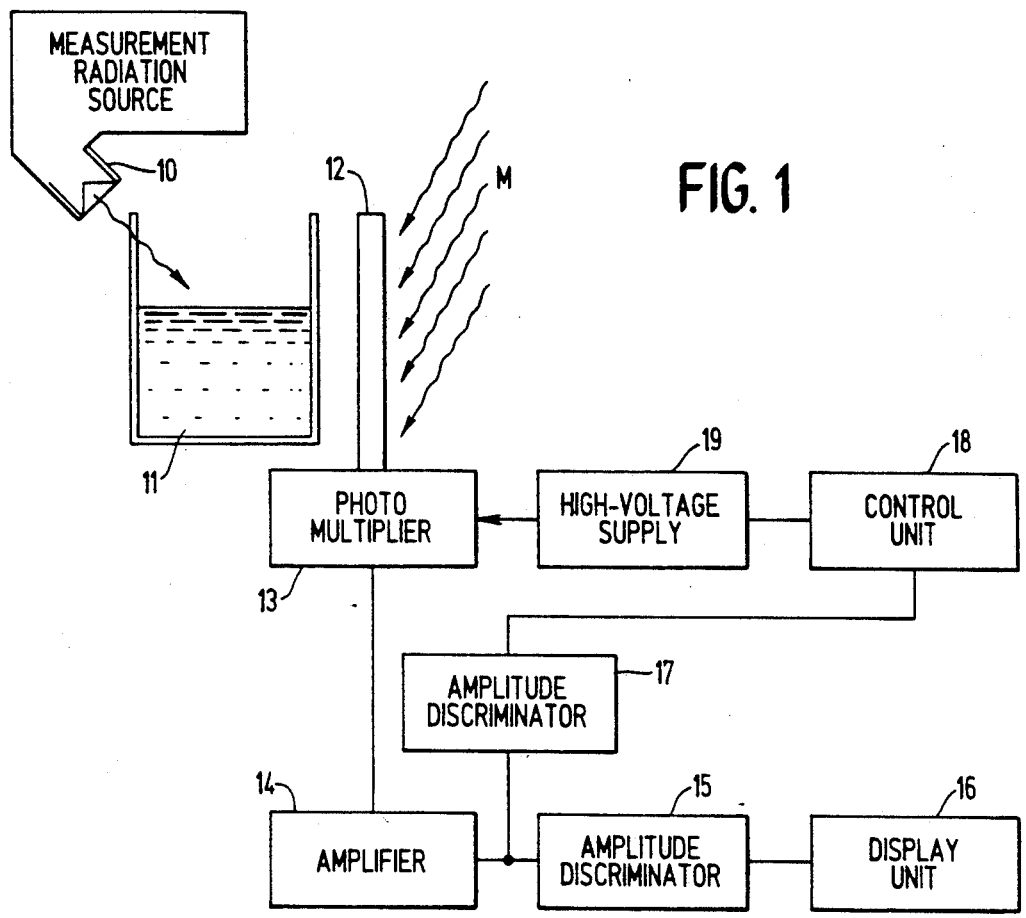
FIG. 1 is a schematic illustration of one embodiment of a measurement apparatus for carrying out a fill level measurement in accordance with the invention.

In the measurement apparatus shown in FIG. 1, a measurement radiation source 10, for instance a cobalt 60 emitter, directs radiation into a vessel 11 containing liquid to permit the fill level of liquid in vessel 11 to be determined. Depending on the fill level of vessel 11, a certain portion of this radiation reaches detector 12, which is a plastic scintillator which outputs corresponding light pulses with a defined spectrum. These light pulses are converted by a downstream photomultiplier 13 into corresponding electrical pulses.

The downstream circuit is composed of electronic amplifier 14, amplitude discriminators 15 and 17, display unit 16, control unit 18 and high-voltage supply 19, all of which may substantially correspond to related components shown in German Patent 18 09 520.

Figure 2A:
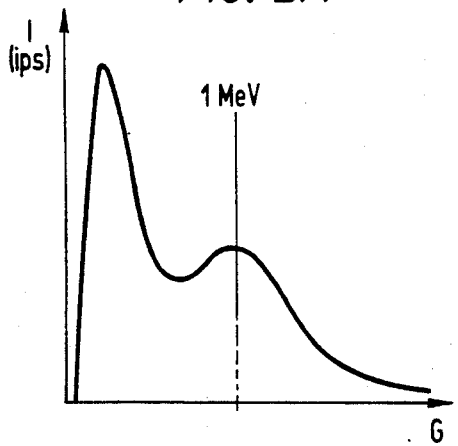
FIGS. 2A and 2B are pulse spectrum diagrams showing exemplary pulse height spectra for a cobalt-60 measurement radiation source and a vertical plastic scintillator produced with the apparatus of FIG. 1.
Figure 2B:
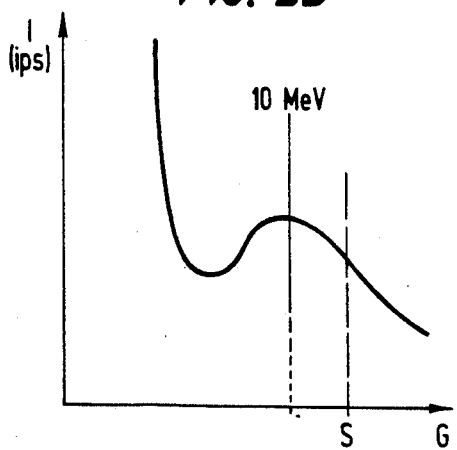

To operate this measuring apparatus by the method according to the invention, uss is made of naturally occurring cosmic radiation M, schematically shown in FIG. 1, which is likewise intercepted by the scintillator 12 and converted into corresponding light pulses. When a vertically arranged plastic rod scintillator 12 of 48 mm diameter and 750 mm length is used, a peak, which is far outside the spectrum of the cobalt 60 source 10 is produced, which is caused by the cosmic radiation M, or rather its hard component, at approximately 10 MeV. The spectrum of the cobalt 60 source is shown in FIG. 2A and the peak caused by naturally occurring cosmic radiation is shown in FIG. 2B.

The counting rate in the region of the "10 MeV" peak is approximately 5 impulses per second (Ips). It is completely free of any other radiation and is therefore suitable for drift stabilization. An integral threshold S placed on this "cosmic radiation peak" or at its edge region can therefore be used (for instance instead of a corresponding threshold S in the spectrum of FIG. 2A) for drift stabilization; the pulses passed by discriminator 17, which is set to pass 10 MeV pulses, are applied to control unit 18 and any change in the rate of those pulses from a desired value results in an adjustment of the power supplied to photomultiplier 13, and hence the magnitude of the photomultiplier output. All that is needed to achieve this is a suitable modification of the electronic components of German Patent 18 09 520 to isolate the 10 MeV pulses.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed:

1. A method for automatic drift stabilization in radiation measurement with a detector, a pulse amplitude integral of measured radiation being produced as a standard for the radiation energy absorbed by the detector, using control devices connected to the output side of the detector to adjust the amplification of the detector output on the basis of a defined threshold in the detector output pulse energy spectrum in such a manner that the rate of all detector output pulses having a pulse height greater than the threshold is kept constant, and the measurement result is correspondingly corrected thereby, wherein said method comprises locating the threshold in the vicinity of a peak in the pulse amplitude spectrum that is caused by the energy loss of naturally occurring cosmic radiation or a component thereof in the detector.

2. The method of claim 1 wherein the threshold is located at the maximum of the peak in the pulse amplitude spectrum that is caused by the high-energy muons in the naturally occurring cosmic radiation.

3. The method of claim 2 wherein the radiation measurement is a fluorescence measurement, the detector is a plastic scintillator, and a photomultiplier is connected for amplifying the detector output pulses.

4. The method of claim 3 wherein the radiation measurement is performed to determine a vessel fill level and the plastic scintillator is in the form of a bar having a thickness of approximately 5 cm.

5. The method of claim 2 wherein the radiation measurement is performed to determine a vessel fill level and the plastic scintillator is in the form of a bar having a thickness of approximately 5 cm.

6. The method of claim 1 wherein the radiation measurement is a fluorescence measurement, the detector is a plastic scintillator, and a photomultiplier is connected for amplifying the detector output pulses.

7. The method of claim 1 wherein the radiation measurement is performed to determine a vessel fill level and the plastic scintillator is in the form of a bar having a thickness of approximately 5 cm.

* * * * *